United States Patent
Lawson, Jr.

(10) Patent No.: US 12,208,846 B2
(45) Date of Patent: Jan. 28, 2025

(54) STEERING AXLE DRIVE ASSEMBLY AND METHOD FOR CONTROLLING SAID DRIVE ASSEMBLY

(71) Applicant: Thomas Towles Lawson, Jr., Charlottesville, VA (US)

(72) Inventor: Thomas Towles Lawson, Jr., Charlottesville, VA (US)

( * ) Notice: Subject to any disclaimer, the term of this patent is extended or adjusted under 35 U.S.C. 154(b) by 0 days.

(21) Appl. No.: 18/322,496

(22) Filed: May 23, 2023

(65) Prior Publication Data

US 2023/0294763 A1    Sep. 21, 2023

Related U.S. Application Data

(62) Division of application No. 16/797,239, filed on Feb. 21, 2020, now Pat. No. 11,702,134.

(60) Provisional application No. 62/832,457, filed on Apr. 11, 2019, provisional application No. 62/808,959, filed on Feb. 22, 2019.

(51) Int. Cl.
  *B62D 7/14*    (2006.01)
  *B62D 9/00*    (2006.01)

(52) U.S. Cl.
  CPC .............. *B62D 7/142* (2013.01); *B62D 9/002* (2013.01)

(58) Field of Classification Search
  CPC .......... A01D 34/66; B62D 7/142; B62D 9/00; B62D 9/002; B62D 11/08
  USPC ................. 180/19.2, 204, 252, 253, 409, 411
  See application file for complete search history.

(56) References Cited

U.S. PATENT DOCUMENTS

| | | | | |
|---|---|---|---|---|
| 5,476,276 | A * | 12/1995 | Hurlburt | B62D 9/00 280/137.5 |
| 2007/0051540 | A1 | 3/2007 | Lawson, Jr. | |
| 2010/0283218 | A1* | 11/2010 | Coers | B60B 35/1063 701/41 |
| 2019/0039651 | A1* | 2/2019 | Brok | B62D 6/00 |

FOREIGN PATENT DOCUMENTS

| | | |
|---|---|---|
| WO | 2002/102644 A1 | 12/2002 |
| WO | 2007/014030 A2 | 2/2007 |
| WO | 2010/046905 A1 | 4/2010 |

* cited by examiner

*Primary Examiner* — Kevin Hurley
*Assistant Examiner* — Felicia L. Brittman-Alabi
(74) *Attorney, Agent, or Firm* — Laubscher & Fretwell, P.C.

(57) ABSTRACT

A steering axle drive assembly includes a steering axle having opposite ends, a wheel pivotally connected with each steering axle end, and a control mechanism. The wheels are operated by the control mechanism for rotation about a vertical axis and a horizontal axis. When the axle is connected with a vehicle, the control mechanism controls the steering axle wheels independent of other wheels of the vehicle, such as the main drive wheels, to steer and drive the vehicle from an origin in any direction without passing through the origin. Preferably, a motor or linear actuator controls the rotation of the steering axle wheels. The steering axle drive assembly can be further improved by including an angled axle.

11 Claims, 8 Drawing Sheets

STEERING AXLE DRIVE ASSEMBLY AND METHOD FOR CONTROLLING SAID DRIVE ASSEMBLY

This application is a divisional of U.S. patent application Ser. No. 16/797,239 filed on Feb. 21, 2020 and based on U.S. provisional application Nos. 62/808,959 filed on Feb. 22, 2019 and 62/832,457 filed on Apr. 22, 2019, the entire contents of which are incorporated herein by reference.

BACKGROUND OF THE DISCLOSURE

The present disclosure relates generally to an axle for a vehicle, and more specifically to an axle for a zero radius turn mower or tractor.

Zero radius turn vehicles are often found in commercial mowing operations and are typically controlled by twin levers which directly or through linkages move trunnions on variable displacement hydraulic pumps. The variable displacement pumps are connected to motors that are connected to two drive wheels. The twin levers control the left and right drive wheel speeds and forward and reverse directions, respectively. Caster wheels, which provide neither traction nor directional stability, are suspended at the end of the vehicle opposite the end with the drive wheels. Moving one lever forward and the other lever in reverse can produce a zero radius turn, though doing so often involves dragging of the caster wheels. Sometimes, in order to transition from a zero radius turn to the left to a sharp turn to the right, the mower might need to complete a multipoint turn, moving in both forward and reverse directions to reach a desired location.

With more recent mowers, a steering wheel is provided which controls a set of wheels that replace the caster wheels. These wheels are mechanically steered by a traditional steering wheel and can be used to achieve a zero radius turn. These mowers offer side slope performance benefits, whereas mowers with non-controlled caster wheels do not.

In addition to existing zero radius turn mowers with steering wheels, the Haun U.S. Pat. No. 9,538,706 discloses controlling such wheels which can rotate about their vertical axes based on signals generated by the position of the twin steering levers. Such a design has drawbacks. Though a vehicle as disclosed by Haun could complete a zero radius turn and other important maneuvers, the wheels would have to rotate about their vertical axes back to a straight-ahead position before changing the direction of the vehicle. Typically one is not required to straighten the steering wheels when backing up after making a forward left or right turn. Parallel parking would be quite tedious, especially for a vehicle with purportedly enhanced maneuverability.

As to tractors, they typically have large rear wheels which are not steered, and a front axle with smaller wheels which are steered. Some tractor-based vehicles like lift trucks, back-end loaders, self-propelled windrowers, and certain mowers include steered wheels at the rear of the vehicle. These vehicles have the same platform as tractor-based vehicles with front-steered wheels but are driven in reverse. Independent left and right brakes on the main drive wheels, which are typically the large rear wheels, allow for sharper turns by slowing the inside wheel and shifting torque to the outside main drive wheel, resulting in a decreased turning radius. Because of mechanical limits of traditional steer axles, this decreased turning radius by braking the inside wheel results in scuffing. In theory, a traditional tractor can make a turn while in four-wheel drive by turning about the main drive wheel that is locked in place by its brake, but in practice, the geometry of the front axle prevents such a tight turn.

For tractors known in the art, when the inside wheel is locked, the steering angles of the front wheels do not allow the axes of the front wheels to intersect at the rear inside wheel. To do so, the front right wheel would have to be perpendicular to the length of the tractor. Known steered wheels, especially driven ones, do not turn that sharply. The result of locking the right rear wheel on a traditional tractor, even when the front wheels are steered all the way to the right or left, is that the front wheels are dragged, the left or right rear wheel slips, and the right or left rear wheel slides. Independent brakes help a tractor turn more sharply, but the tractor prevents a pivot turn.

There is thus a need for mowers, tractors or similar vehicles to function such that a zero-radius turn can be completed more efficiently, and sharp turns or other challenging maneuvers can be completed with simpler controls.

SUMMARY OF THE DISCLOSURE

Accordingly, it is an object of the present disclosure to provide a steering axle drive assembly which independently controls the wheels opposite the main drive wheels of a vehicle. The steering axle drive assembly includes a steering axle having opposite ends, a wheel pivotally connected with each steering axle end, and a control mechanism. The wheels are operated by the control mechanism for rotation about a vertical axis and a horizontal axis. When the axle is connected with a vehicle, the control mechanism controls the steering axle wheels independent of other wheels of the vehicle, such as the main drive wheels, to steer and drive the vehicle from an origin in any direction without subsequently passing through the origin. Preferably, a motor or linear actuator controls the rotation of the steering axle wheels.

In a preferred embodiment, the control mechanism includes a joystick connected with a controller. The controller receives a coordinate input from the joystick and provides an output to the steered axle to control the rotation of the wheels about the respective vertical and horizontal axes. In this embodiment, the controller sends signals to an actuator to control the wheels about both the vertical and horizontal axes.

In an alternate embodiment, a first signal is sent to a first controller, via a joystick or other control mechanism, for rotating the wheels about their horizontal axes, and a second signal is sent to a second controller, for rotating the wheels about their vertical axes. The first and second signals are associated with control mechanism x and y input values, respectively.

In yet another embodiment, the control mechanism includes a steering wheel for steering the wheels and a lever for driving the wheels forward or reverse, independent of another axle and other wheels on the vehicle.

In embodiments which include a controller, there is preferably at least one operator interface such as a switch, button, lever or pedal for controlling the steering axle wheels about their vertical and horizontal axes via a motor, linear actuator, or brake.

In a further embodiment, an independently controlled brake is connected with each of the steering axle wheels to restrict rotation of the wheels about the respective vertical axes. A steering angle is defined when at least one of the brakes is independently applied to a wheel and the wheels are independently driven about their respective horizontal axes.

It is also an object of the present disclosure to provide an axle assembly for a vehicle that includes a symmetrically angled axle and wheels pivotally connected with the axle. The axle has a midsection and axle ends and is connectable with the vehicle such that the midsection is arranged forward of the axle ends. The wheels are connected with the axle ends for rotation about a vertical axis and a horizontal axis. When the symmetrically angled axle is connected with the vehicle, the wheels are pivotable about their respective vertical axes to a position in which radii extend from a center point of a second axle through each horizontal axis to define a geometric relationship between the angled axle wheels and the second axle. This geometric relationship allows the vehicle to complete a zero radius turn without sliding or scuffing.

In a preferred embodiment, the axle assembly further includes a hinge assembly connected with each of the axle ends and wheels. The hinge assemblies have a pivot pin that is coaxial with an associated vertical axis.

It is further an object of the present disclosure to provide a method for completing a zero radius turn for a vehicle. The vehicle includes the above described steering axle drive assembly as well as an additional wheeled axle, a transmission, a left wheel and brake, and a right wheel and brake. The left and right brakes of the additional wheeled axle are independently controlled. The method includes the steps of rotating the steering axle drive assembly wheels about the vertical axis in a left or right direction, braking a left wheel of the second wheeled axle in response to rotating the wheels of the first wheeled axle in a right direction and braking the right wheel of the second wheeled axle in response to rotating the wheels of the first wheeled axle in a left direction, driving the wheels of the first wheeled axle about the respective horizontal axes in a forward direction, and driving the unbraked wheel of the second wheeled axle about its horizontal axis in a reverse direction.

BRIEF DESCRIPTION OF THE FIGURES

Other objects and advantages of the disclosure will become apparent from a study of the following specification when viewed in the light of the accompanying drawing, in which.

DETAILED DESCRIPTION

Figure 1:
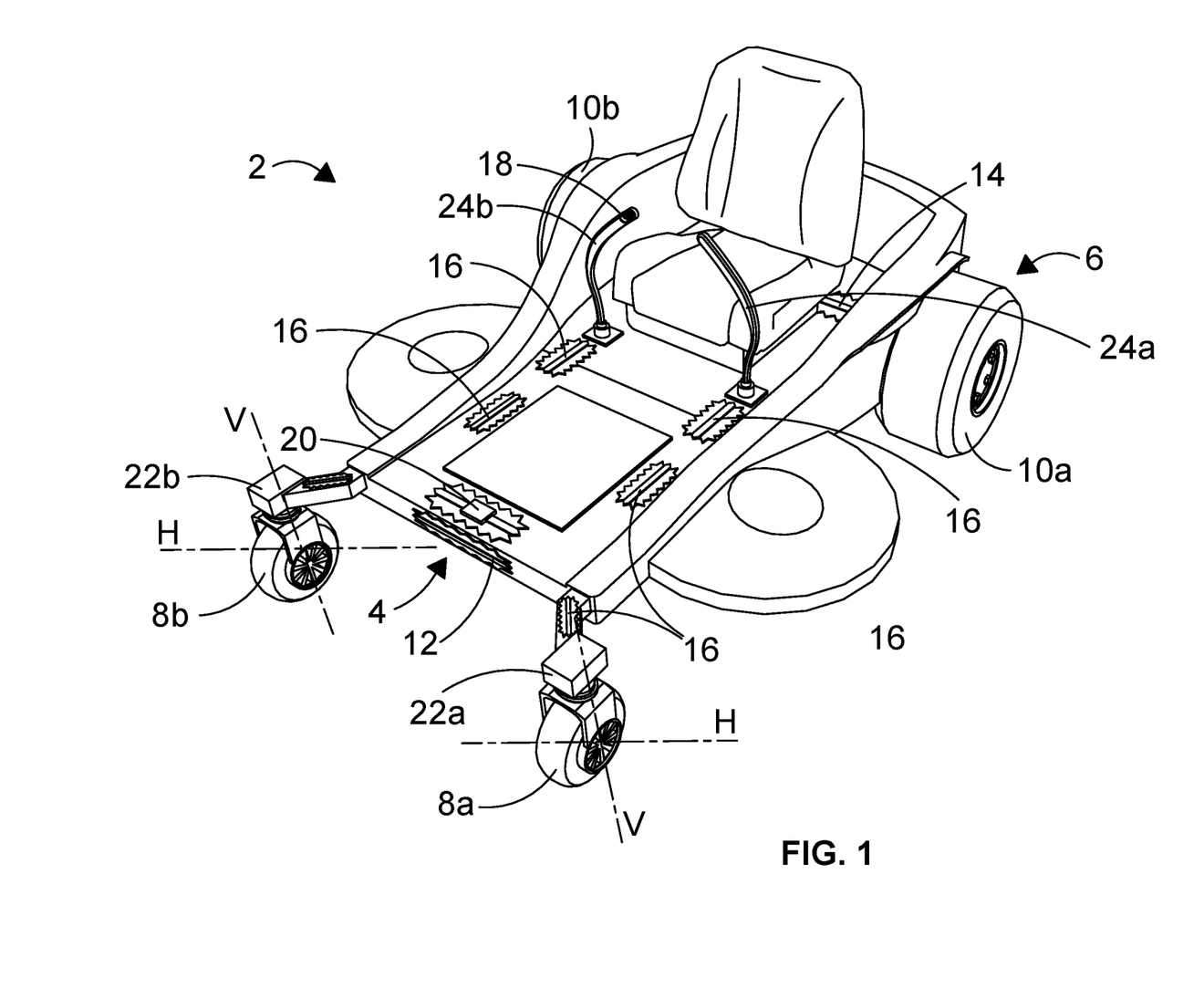
FIG. 1 is a perspective view of a first embodiment of a zero radius turn mower having a steering axle drive assembly according to the present disclosure.

The present disclosure relates to a steering axle drive assembly for a vehicle and a method for completing a zero radius turn with a vehicle that has the drive assembly. Referring to FIG. 1, there is shown a first embodiment of the assembly used with a zero radius turn mower 2. The mower has a steering axle drive assembly 4 and rear axle assembly 6, each of which include a pair of wheels 8*a*, 8*b* and 10*a*, 10*b* connected with each associated axle 12, 14. The front axle wheels 8*a*, 8*b* a are pivotally connected with each steering axle end for rotation about a vertical axis V and rotation about a horizontal axis H, respectively, independent of any controls related to the rear axle wheels 10*a*, 10*b*. A control mechanism 16 controls the position of each front steering axle wheel 8*a*, 8*b* about each respective vertical and horizontal axis. The control mechanism 16 includes a joystick 18, a controller 20 and motors 22*a*, 22*b*. When the right joystick 18 is pivoted forward or back, a y-axis signal is sent to the controller 20 which engages the motors 22*a*, 22*b* to rotate the wheels 8*a*, 8*b* forward or reverse, respectively. When the joystick 18 is pivoted left or right, an x-axis signal is sent to the controller which engages the motors to rotate the wheels 8*a*, 8*b* left or right, respectively. The controller can process both x and y signals simultaneously. Levers 24*a*, 24*b* connected with the rear axle 14 are pushed forward or pulled back to control the rear wheels 10*a*, 10*b*, respectively. The front wheels 8*a*, 8*b* are thus steered and driven according to the inputs from the joystick 18 to the controller 20 independent of any control over the rear wheels 10*a*, 10*b*. It will be understood by those with skill in the art that, as detailed below, the control mechanism 16 could involve one or more joysticks, or other such devices, one or more controllers, one or more motors, or another method for rotating the steered axle wheels. Preferably, the steered axle wheels 8*a*, 8*b* rotate about a vertical axis V over a range of at least 150-degrees and more desirably a range from 180- to 360-degrees.

Figure 2:
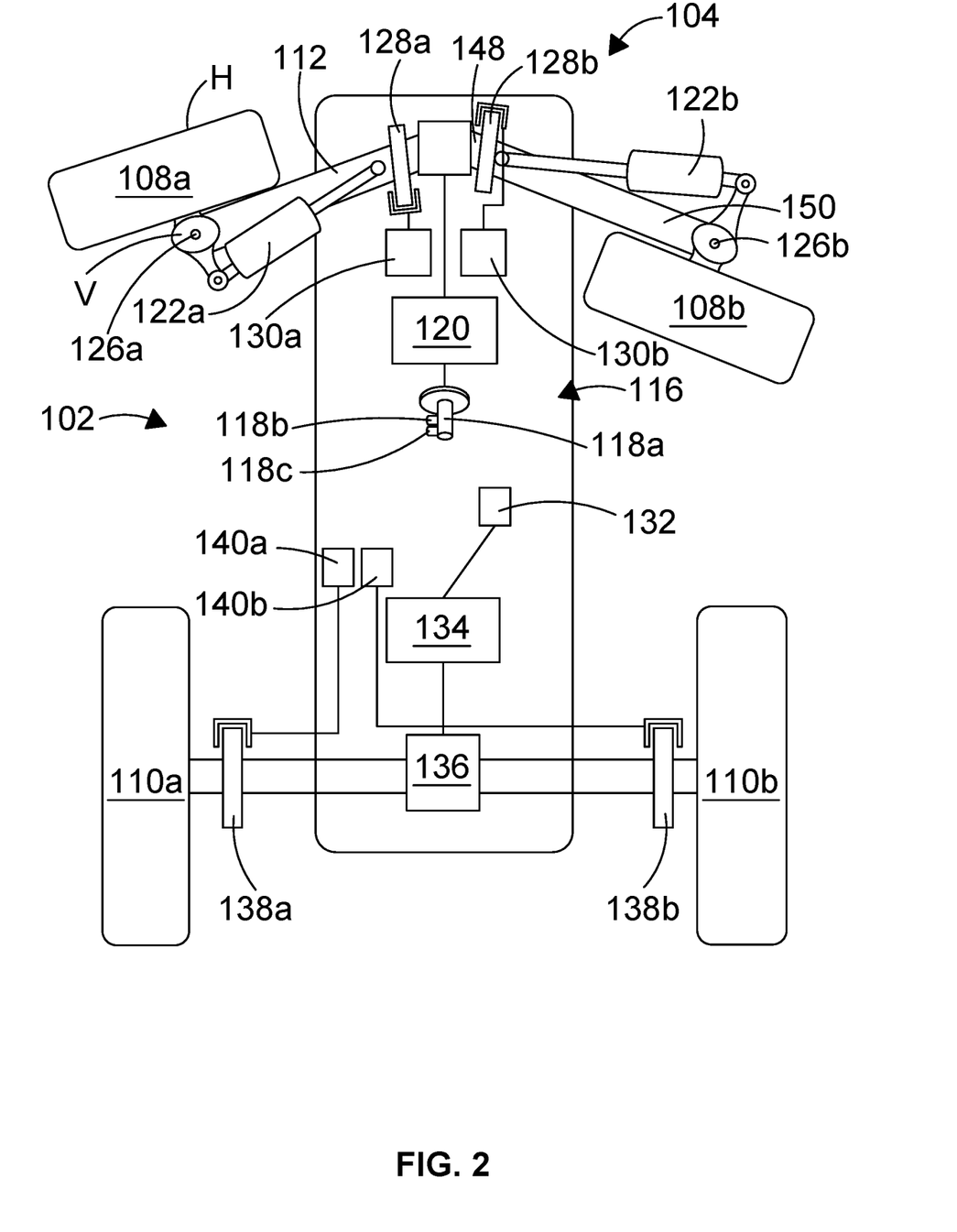
FIG. 2 is a schematic view of a first embodiment of a tractor having a steering axle drive assembly according to the present disclosure.

Referring now to FIGS. 2-5, embodiments of the steering axle assembly connected with tractors are shown. FIG. 2 shows a first tractor 102 with a steering axle drive assembly 104 attached thereto. The steering axle drive assembly 104 includes front wheels 108*a*, 108*b* that are connected to ends of an angled steering axle 112 and controlled via linear actuators 122*a*, 122*b*, for instance pneumatic or hydraulic cylinders, which selectively prevent the wheels from rotating about pins 126*a*, 126*b* when a steering set point is reached, and by selectively allowing the wheels to rotate around the ends of the axle 112 when a steering angle change is initiated. The control mechanism 116 is connected with a controller 120 to drive the wheels forward and reverse via a joystick 118*a*. Buttons 118*b*, 118*c* engage the right and left actuator, respectively, to steer the wheels. The steering axle drive assembly 104 of this embodiment also includes a pair of brakes 128*a*, 128*b* controlled via brake pedals 130*a*, 130*b* for restricting horizontal rotation of each steering axle wheel 108*a*, 108*b*. The rear wheels 110*a*, 110*b* are controlled via a treadle 132 which is connected with a transmission 134 and differential 136. The treadle drives the rear wheels 110*a*, 110*b* forward and reverse, and rear wheel brakes 138*a*, 138*b* restrict horizontal rotation of each rear wheel 110*a*, 110*b*, respectively. They are controlled via rear brake pedals 140*a*, 140*b*.

Figure 3:
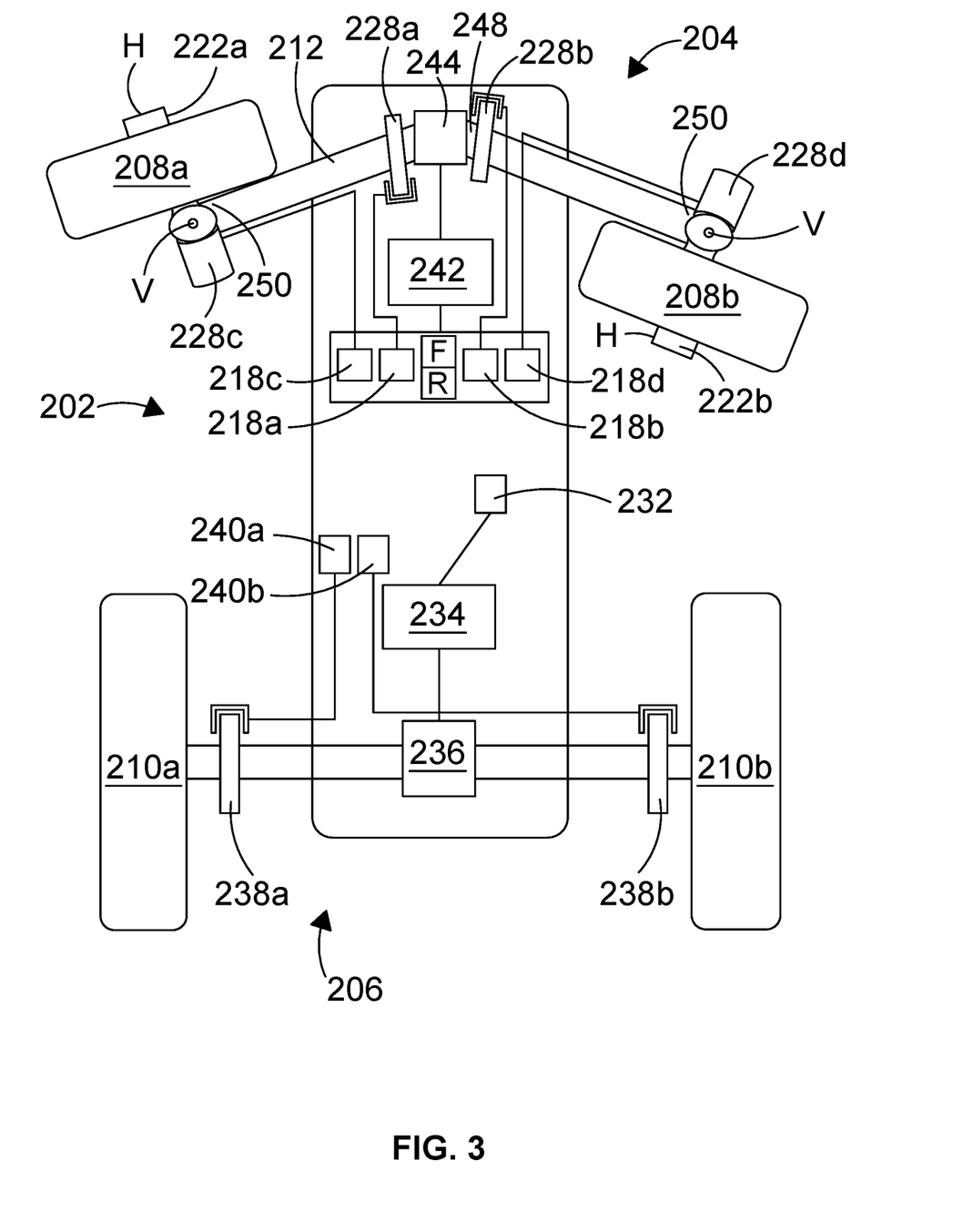
FIG. 3 is a schematic view of a second embodiment of a tractor having a steering axle drive assembly according to the present disclosure.

Referring to FIG. 3, there is shown a tractor 202 that includes a steering axle drive assembly 204 with wheels 208a, 208b and a rear axle assembly 206 with wheels 210a, 210b. The front wheels 208a, 208b are connected with the end of an angled steering axle 212 and are controlled via a control mechanism 216, brakes 228a, 228b, 228c, 228 and motors 222a, 222b. The control mechanism includes a first set of buttons 218a, 218b for controlling drive brakes 228a, 228b, respectively, and a second set of buttons, 218c, 218d for controlling steering brakes 228c, 228d, respectively. There is also a centrally located switch 218e for shifting a front transmission 242 into forward or reverse and for driving the motors 222a, 222b. The front transmission is further connected with a front differential 244 for controlling the torque of the front wheels 208a, 208b. As with the tractor in FIG. 2, there are rear wheels 210a, 210b controlled via a treadle 232, a transmission 234, a differential 236 and rear wheel brakes 238a, 238b, which are controlled by pedals 240a, 240b, respectively.

Figure 4:
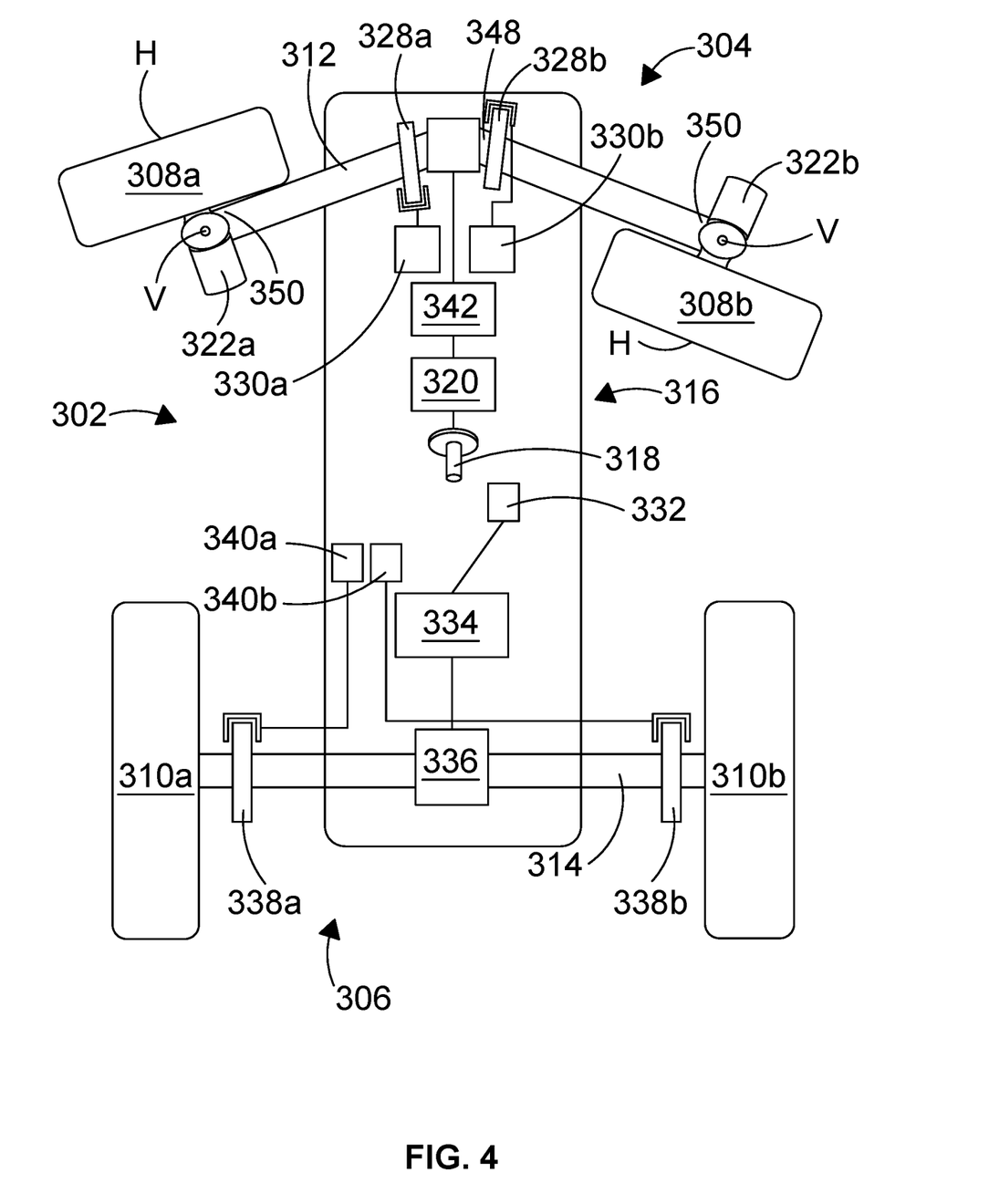
FIG. 4 is a schematic view of a third embodiment of a tractor having a steering axle drive assembly according to the present disclosure.

FIG. 4 shows a tractor 302 that includes a steering axle drive assembly 304 and rear axle assembly 306, similar to those shown in FIGS. 2 and 3. The steering axle drive assembly includes wheels 308a, 308b connected with an angled steering axle 312, and the rear axle assembly includes wheels 310a, 310b connected with a rear axle 314. The rear axle wheels are driven forward or reverse via a treadle 332, a transmission 334, and a differential 336. Rear brakes 338a, 338b are controlled via pedals 340a, 340b. Similar to FIG. 2, the steering axle drive assembly includes drive brakes 328a, 328b for restricting horizontal rotation of the front wheels 308a, 308b, respectively, which are engaged by pedals 330a, 330b. The front wheels 308a, 308b are driven forward and reverse and steered left and right via a control mechanism 316 which includes a joystick 318, a controller 320, a transmission 342, and motors 222a, 222b connected with their respective wheels.

Figure 5:
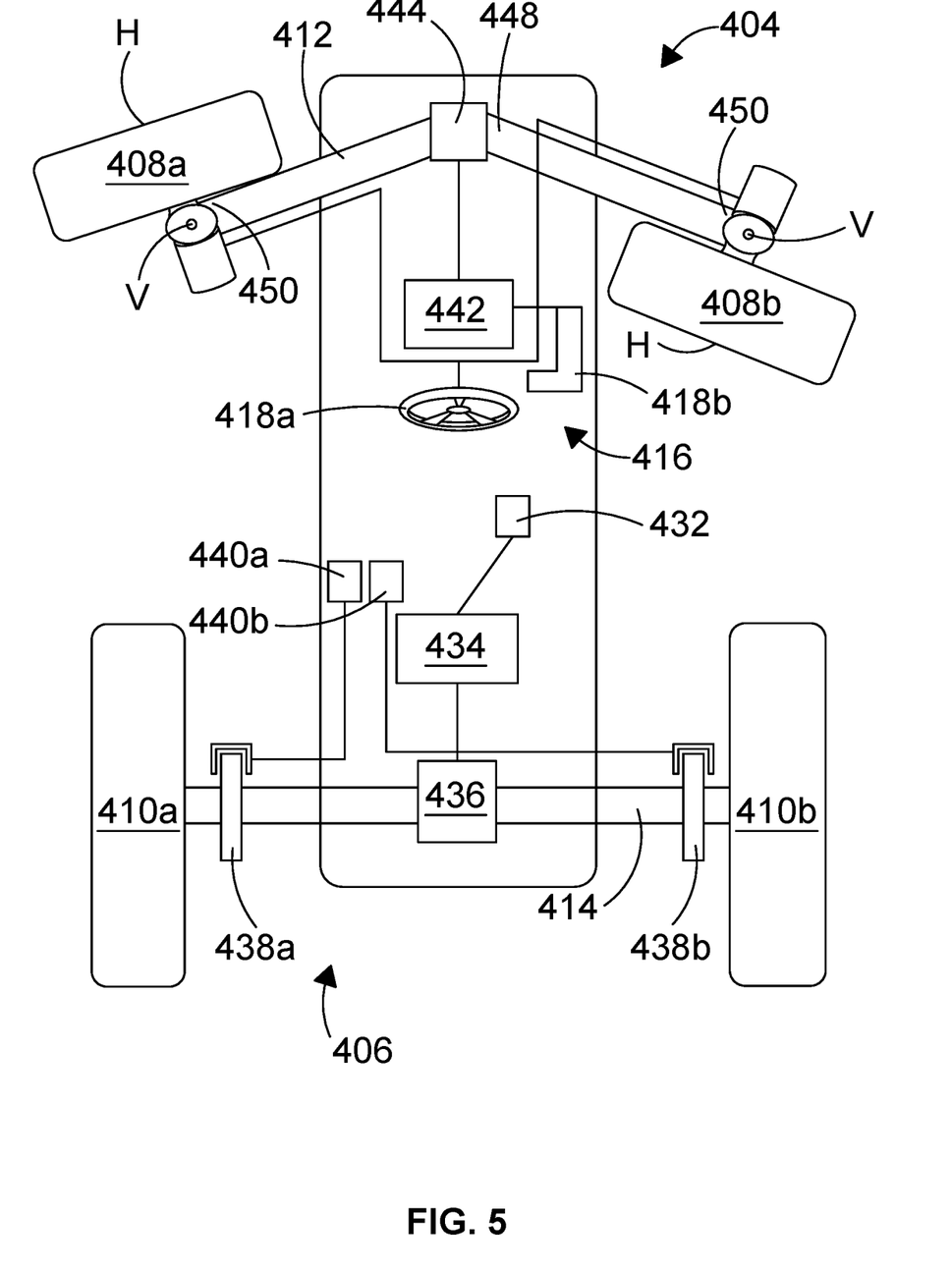
FIG. 5 is a schematic view of a fourth embodiment of a tractor having a steering axle drive assembly according to the present disclosure.

The embodiment shown in FIG. 5 is similar to those of FIGS. 2-4 but the control mechanism 416 includes a steering wheel 418a and a drive lever 418b connected with a transmission 442 and a differential 444. The front wheels 408a, 408b are driven and steered independent of the rear wheels 410a, 410b, and are electrically controlled. As with the other tractor embodiments, there is a steering axle drive assembly 404 and a rear axle drive assembly 406, each of which includes an axle 412, 414. There are also rear brakes 438a, 438b and brake pedals 440a, 440b, respectively. The steering wheel 418a is connected with the front wheels 308a, 308b to rotate them about their vertical axes, and the drive lever 418b is connected with the transmission 442 to drive the wheels forward or reverse. A treadle 432 is connected with a rear axle transmission 434 and differential 436 to drive the rear wheels forward and reverse.

Figure 6:
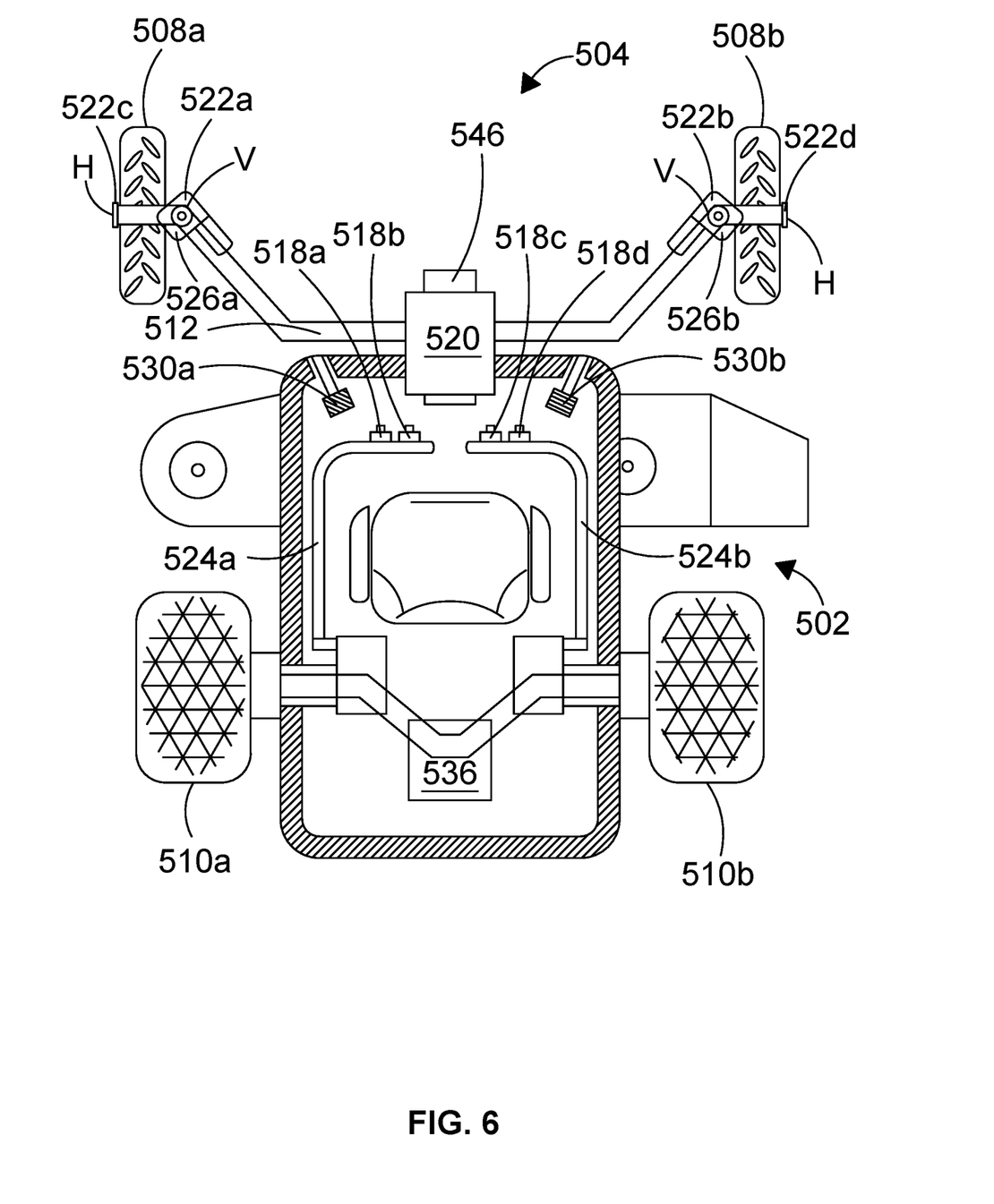
FIG. 6 is a schematic view of an embodiment of a zero radius turn mower having a steering axle drive assembly according to the present disclosure.
Figure 7:
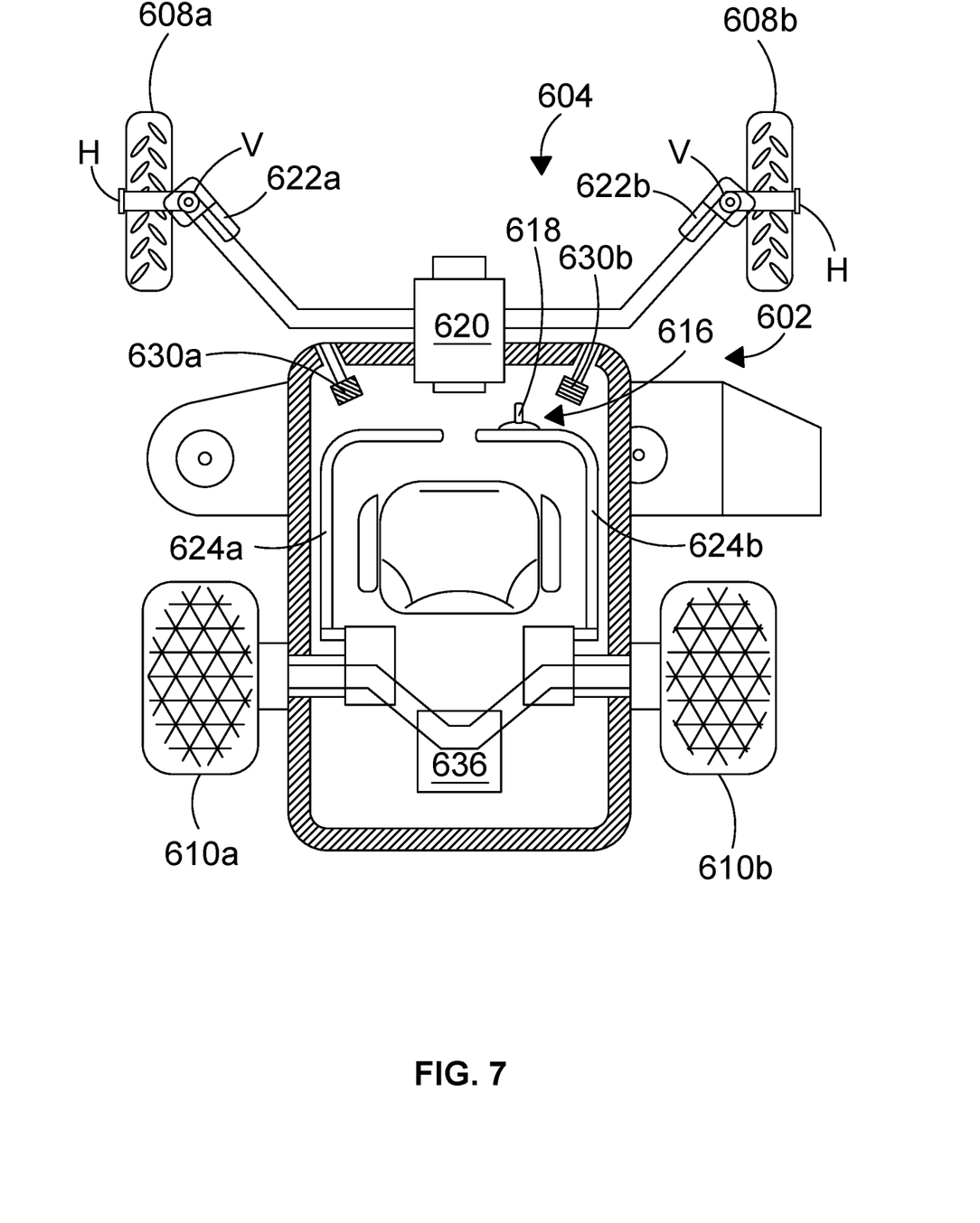
FIG. 7 is a schematic view of another embodiment of a zero radius turn mower having a steering axle drive assembly according to the present disclosure.

Referring now to FIGS. 6 and 7, embodiments of a zero radius turn mower with a steering axle assembly are shown. In FIG. 6, the mower 502 has a steering axle drive assembly 504 with wheels 508a, 508b that are controlled independent of the vehicle rear wheels 510a, 510b. The vehicle includes a front 512 axle with front wheels 508a, 508b and a control mechanism 516 for controlling rotation of the front wheels about their vertical V and horizontal H axes. The mower 502 also includes levers 524a, 524b connected with the rear wheels 510a, 510b for controlling the driving force of those wheels. There is an engine and dual hydrostatic pump drive or dual electric motor 536 for controlling the torque of the rear wheels. The control mechanism 516 of this embodiment includes buttons 518a, 518b, 518c, 518d arranged on the levers 524a, 524b and drive pedals 530a, 530b. The levers are pushed forward or pulled back to drive the tractor forward or reverse, respectively. The buttons are engaged to send a signal to a controller 520 which in turn causes motors 522a, 522b to steer the wheels 508a, 508b. The pedals 530a, 530b are pushed to engage additional motors 522c, 522d to drive the wheels.

FIG. 7 shows a zero radius turn mower 602 with a steering axle drive assembly 604 which is similar to the mower shown in FIG. 6, but the control mechanism 616 for controlling the front wheels 608a, 608b includes a single joystick 618 arranged on the right drive lever 624b. The joystick 618 is moved forward/back and left/right to provide x and y signals, respectively, to a controller 620, which in turn engages motors 622a, 622b to steer and drive the wheels according to the signals received by the controller. As with the mower of FIG. 6, the mower includes an engine and dual hydrostatic pump drive or dual electric motor 636 and rear wheels 610a, 610b which are controlled via drive levers 624a, 624b. The front pedals 630a, 630b apply brakes for controlling the horizontal rotation of the front wheels 608a, 608b.

Figure 8:
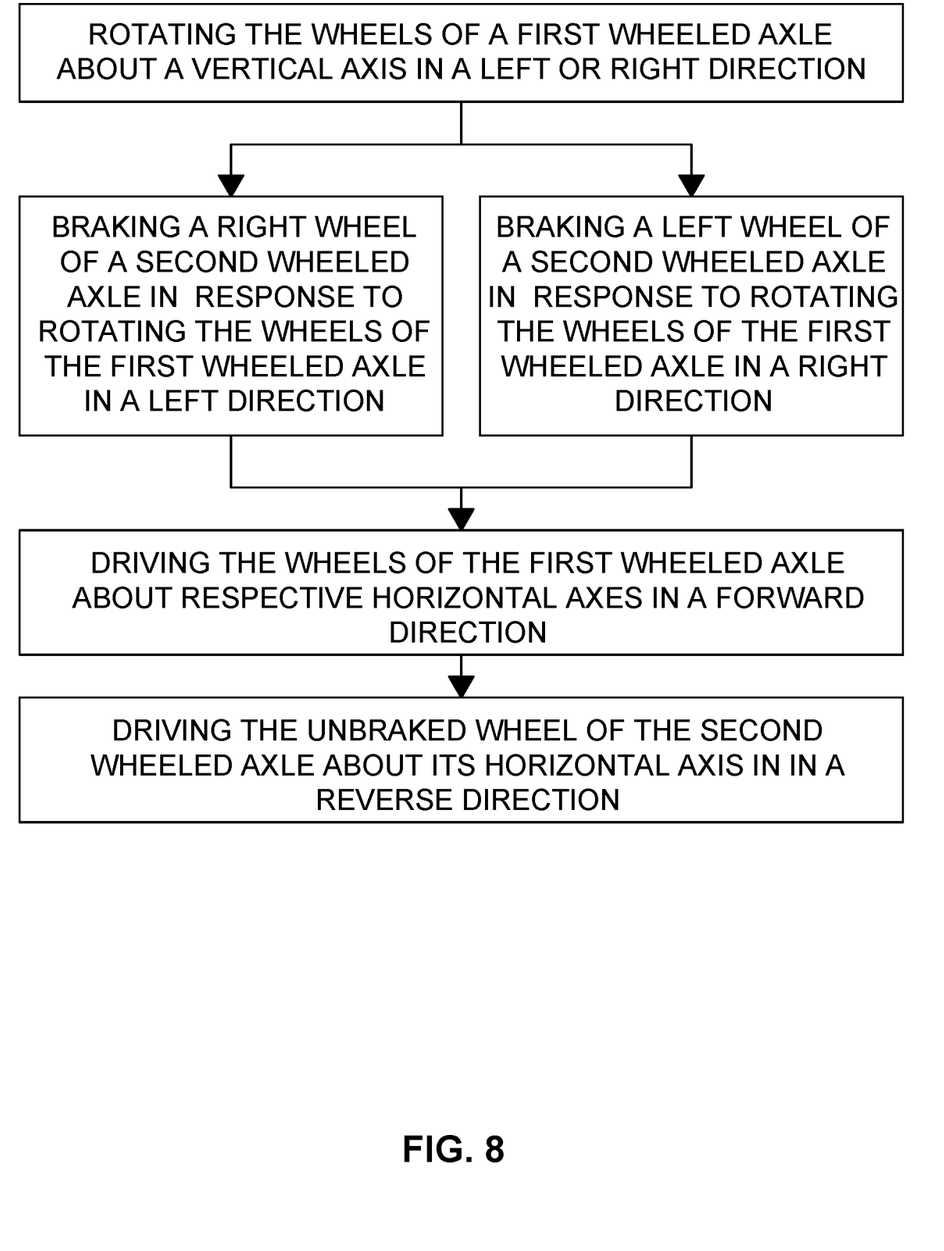
FIG. 8 is a flow chart showing a method for completing a zero radius turn of a vehicle according to the present disclosure.

Referring now to FIG. 8, there is shown the method steps for controlling a vehicle to complete a zero radius turn. This allows the vehicle to drive directly to a location without the need for a multipoint turn involving both forward and reverse directions. The steps include independently rotating the wheels of the front axle about their respective vertical axes in a first direction to the left or right, and independently rotating at least one wheel of the rear axle about a horizontal axis forward or reverse.

More specifically, a method for controlling the tractor 302 of FIG. 4 will now be described. To turn to the right, the steering axle wheels 308a, 308b of the first wheeled axle 310 are rotated about their vertical axes V to the right, a brake 334a is applied to the rear left wheel 310a of the second wheeled axle 314, the front wheels are driven about their horizontal axes H in a forward direction, and the right wheel 310b of the second wheeled axle is driven in reverse. To complete a turn to the left, the opposite is done. That is, the front wheels 308a, 308b are steered to the left, a brake 334b is applied to the rear right wheel 310b, the front wheels are driven forward, and the rear left wheel 310a is driven in reverse. This allows for a zero radius turn without any scuffing or dragging of the front wheels.

Referring again to FIG. 6, additional methods for maneuvering a vehicle having the steering axle drive assembly disclosed herein are described. The mower 502 includes four normally open momentary button switches 518a, 518b, 518c, 518d. When the left switches 518a, 518b are depressed, a steering motor 522a rotates the front left wheel 508a about the left pin 526a to the left about its vertical axis V. The left pedal 530a is engaged to send a signal to the controller 520 to power the hub motor 522c to drive the left wheel 508a in reverse. Alternatively, to steer the front left wheel 508a to the right, only the left most button 518a is depressed. The control of the left pedal and hub motor can be switched to drive the left wheel 508a forward.

The right switches 518c, 518d and right pedal 530b perform similar functions on the front right wheel 508b. When both switches 518c, 518d are depressed, the steering motor 522b rotates the right wheel 508b about the right pin 526b to the left about its vertical axis V. To steer the front right wheel to the right, only one button 518c is depressed. The right pedal 530b is engaged to signal the controller 520 to power the hub motor 522d to drive the right wheel 508b in reverse. The control of the pedal and hub motor can be switched to drive the wheel forward.

It will be obvious to those skilled in the art that many different systems and switches might be used to control the steering motors and wheel speeds. Also, depending on terrain and size of the steering motor, the wheels may need to apply a braking force when the vehicle is moving rather than actually rotating the inside wheel backward. For instance, to turn left while the vehicle is going forward, a brake must be applied to the left front wheel, while the left steering motor turns the wheel to the left.

Referring again to FIG. 6, to make a left turn, both left switches 518a, 518b on the left lever 524a are pressed to signal the steering motor 522a to steer the left wheel 508a to the left, and both switches 518c, 518d on right lever 524b are pressed to signal the steering motor 522b to steer the right wheel 508b to the left. The right lever 524b is then pushed further forward than the left lever 524a to drive the right rear wheel 510b faster than the left rear wheel 510a. To make a right turn, one button 518a on the left lever 524a is pressed, one button 518d on the right lever 524b is pressed, and the left lever 524a is moved further forward than the right lever 524b. It will be understood by those with skill in the art that, rather than using buttons to complete these turns, a steering wheel with pedals or a lever (as shown in FIG. 5) can be used. Further, as shown in FIG. 7, a joystick and controller can be used to produce the signals that cause the motors to steer and drive the wheels.

In the embodiment of FIG. 6, there are pins 526a, 526b having sensors/indicators for aiding the operator of the vehicle with coordinating angles of the wheels 508a, 508b, preferably with demarcations so that individual turning radii can be chosen. This allows the operator to know when the two steering angles correspond to Ackerman steering, and whether the horizontal axes H of both wheels 508a, 508b point to a specific location on the rear axle 514.

In this embodiment, a controller 520 receives steering command input from an operator through an operator interface 546 which receives signals from the buttons 518a, 518b, 518c, 518d. Sensors 526a, 526b send signals to the controller 520 which can calculate Ackerman or other desired geometries when performing the steering command input received from the control mechanism 516. As is shown in the other embodiments described above, a joystick or joysticks, steering wheel, pedals, levers or other devices can be substituted for the buttons 518a, 518b, 518c, 518d. Further, an algorithm, or indicator reference marks, can be substituted for the operator's judgement.

For this embodiment, the operator manually controls the speeds of the rear drive wheels 510a, 510b. It is easier to steer first and then coordinate the wheel speeds than it is to do both simultaneously. The pin with sensors 526a, 526b measure the steering angles and the controller 520 uses that information to dictate the actions of the steering motors in accordance with the steering command from the control mechanism 516.

Referring again to FIGS. 2-5, there is shown an angled steering axle 112, 212, 312, 412. The axle is angled such that a midsection 148, 248, 348, 448 is arranged forward of axle ends 150, 250, 350, 450. When the wheels of these angled axles are rotated about their vertical axis to perform a turn, they can be steered to a position in which two radii extend from a center point of the rear axle 114, 214, 314, 414, through the horizontal axis of each front wheel to define a preferred geometric relationship between the angled axle wheels and the rear axle, such as with Ackerman steering. The tractor can then complete a zero-radius turn without sliding or scuffing. It will be understood by those of skill in the art that such an angled axle can be incorporated with the mowers of FIGS. 1, 6 and 7, as well as with other similar vehicles.

Preferably, the above-noted angled axles are configured to form a 135-degree angle, but it will be understood by those with skill in the art that other angles that achieve the same geometric goals as described herein could be used.

Regardless of the vehicle with which the angled axle is used, the front steering wheels of that axle each have a horizontal and vertical axis about which each wheel rotates. Referring again to FIG. 3, another method for steering and driving a tractor will be described. First, both the vertical axes brakes 228c, 228d are released, one of the horizontal axis brakes 228a, 228b of one wheel is engaged, and the horizontal axis brake of the other wheel is released. The front wheels 208a, 208b are then driven. The wheel without the horizontal axis brake engaged will be driven forward, while the wheel with the horizontal axis brake engaged will rotate about its vertical axis causing the mower to turn. The brakes and driving force of the two front wheels can be varied to steer the front wheels.

The vertical axis brake may be a traditional friction brake but might also be a hydraulic cylinder and rod. The steered wheels of the angled axle may rotate many degrees about their vertical axes, approaching 180 degrees or more. Hydraulic cylinders and rods cannot generate rotary motion of 180 degrees by themselves but can act as a brake over more than 180 degrees. When the brake is released, the wheel can move freely around the vertical axis to steer the machine, which is achieved by applying a driving force to the wheel. When the brake is applied, any driving force of the associated wheel drives the machine rather than steers it. It will be understood by those with skill in the art, that the wheels can be steered via a motor rather than with releasing one or more vertical axes brakes.

In addition to improved turning from the angled axle, an independent transmission on the front wheels further improves the effectiveness of a zero radius turn or any forward turn which is sufficiently sharp such that a rear wheel moves backwards. For instance, for a right turn where the tractor pivots about the right rear wheel, the axle allows the horizontal axes of the two front wheels to intersect at the right rear wheel. When the left rear wheel and the front wheels are driven forward, the right rear wheel is stationary, and a turn is achieved that is sharper and more effective than with other tractor axles known in the art.

In addition to mechanical or electric controls, the angled steering axle can be controlled by an electronic operator interface and/or a joystick. The x and y axes of the joystick provide directions to front wheels of a tractor that is retrofitted with the angled axle described above. The operator provides instructions to the front axle and the wheels mounted on it to drive forward and reverse and to steer with an Ackerman geometry as calculated by a controller. The operator is then tasked with the mechanical duties of operating the foot clutch, the manual transmission shift lever and rear wheel brakes.

Although the above description references particular embodiments, it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure.

What is claimed is:

1. A steering axle drive assembly for a vehicle, comprising:
   a. a steering axle having opposite ends;
   b. a wheel pivotally connected with each steering axle end for rotation about a vertical axis and rotation about a horizontal axis, said wheel being rotatable through an angle of at least 150-degrees about its vertical axis; and
   c. a control mechanism controlling the position of each of said steering axle wheels about each respective vertical axis and driving said steering axle wheels about each respective horizontal axis, said control mechanism controlling said steering axle wheels independent of other wheels of the vehicle to steer and drive the vehicle from a first angle and path directly to any other angle and path without passing through the origin of the first angle and path.

2. A steering axle drive assembly as defined in claim 1, wherein each of said steering axle wheels is rotatable between 180-degrees and 360-degrees about the respective vertical axis.

3. A steering axle drive assembly as defined in claim 1, wherein said control mechanism includes a joystick connected with a controller, said controller receiving a coordinate input from said joystick and providing an output to said steering axle wheels to control the rotation of said steering axle wheels about the respective vertical and horizontal axes.

4. A steering axle drive assembly as defined in claim 1, wherein said control mechanism includes a steering wheel and at least one lever to control the rotation of said steering axle wheels about the respective vertical and horizontal axes.

5. A steering axle drive assembly as defined in claim 1, wherein said control mechanism provides a first signal to said wheels for rotation about said horizontal axis and provides a second signal to said wheels for rotation about said vertical axis, said first signal and said second signal being associated with control mechanism x and y input values, respectively.

6. A steering axle drive assembly as defined in claim 1, and further comprising at least one operator interface including at least one of a switch, button, lever and pedal for controlling said steering axle wheels about one of their vertical and horizontal axes via one of a motor, linear actuator, or brake.

7. A steering axle drive assembly as defined in claim 1, wherein one of at least one motor and at least one linear actuator controls the rotation of said steering axle wheels about said vertical axes, respectively.

8. A steering axle drive assembly as defined in claim 7, wherein said at least one linear actuator comprises one of a hydraulic cylinder, pneumatic cylinder and electric actuator.

9. A steering axle drive assembly as defined in claim 1, and further comprising an independently controlled brake connected with each of said steering axle wheels.

10. A steering axle drive assembly as defined in claim 9, wherein each of said independently controlled brakes restricts rotation of each of said steering axle wheels about the respective vertical axis, whereby a steering angle is defined when at least one of said brakes is independently applied to a steering axle wheel and said steering axle wheels are independently driven about their respective horizontal axes.

11. A steering axle drive assembly as defined in claim 1, wherein said steering axle has a symmetrically angled configuration connectable with the vehicle such that a steering axle midsection is arranged forward of said steering opposite ends.

* * * * *